United States Patent
Saje et al.

(10) Patent No.: US 9,290,206 B2
(45) Date of Patent: Mar. 22, 2016

(54) CAST DATUMS FOR WHEELBASE TUNING

(71) Applicant: GM Global Technology Operations LLC, Detroit, MI (US)

(72) Inventors: Robert N. Saje, Shelby Township, MI (US); John C. Johnson, Macomb Township, MI (US); Chad Cromwell, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 13/929,926

(22) Filed: Jun. 28, 2013

(65) Prior Publication Data

US 2015/0001893 A1   Jan. 1, 2015

(51) Int. Cl.
| | |
|---|---|
| *B62D 25/08* | (2006.01) |
| *B62D 25/02* | (2006.01) |
| *B62D 25/16* | (2006.01) |
| *B62D 25/20* | (2006.01) |

(52) U.S. Cl.
CPC .............. *B62D 25/02* (2013.01); *B62D 25/087* (2013.01); *B62D 25/16* (2013.01); *B62D 25/2027* (2013.01)

(58) Field of Classification Search
CPC ............................ B62D 21/152; B62D 21/155
USPC ............. 296/187.01, 187.11, 193.08, 203.04, 296/26.01, 26.08
See application file for complete search history.

(56) References Cited

U.S. PATENT DOCUMENTS

| | | | | |
|---|---|---|---|---|
| 5,364,128 | A * | 11/1994 | Ide ................................ | 280/784 |
| 5,725,247 | A * | 3/1998 | Nilsson et al. ................ | 280/781 |
| 6,334,252 | B1 * | 1/2002 | Sato et al. .................... | 29/897.2 |
| 6,398,261 | B1 * | 6/2002 | Ammer et al. ................ | 280/781 |
| 6,533,348 | B1 * | 3/2003 | Jaekel et al. .................. | 296/205 |
| 8,177,293 | B2 * | 5/2012 | Boettcher ...................... | 296/204 |
| 8,276,980 | B2 * | 10/2012 | Boettcher et al. ......... | 296/193.07 |
| 8,960,776 | B2 * | 2/2015 | Boettcher et al. ......... | 296/193.07 |
| 2004/0239091 | A1 * | 12/2004 | Horton et al. ................. | 280/781 |
| 2005/0116460 | A1 * | 6/2005 | McGill et al. ................. | 280/781 |
| 2007/0276526 | A1 * | 11/2007 | Swanson ......................... | 700/95 |
| 2013/0088045 | A1 * | 4/2013 | Charbonneau et al. .. | 296/187.12 |
| 2013/0278016 | A1 * | 10/2013 | Kia et al. .................. | 296/193.02 |
| 2015/0001279 | A1 * | 1/2015 | Yao et al. ..................... | 228/49.1 |
| 2015/0001887 | A1 * | 1/2015 | Saje et al. ................. | 296/193.08 |

OTHER PUBLICATIONS

GEO Pallet Conveyor System www.fatainc.com/gallery/main.php?g2 itemId=75 May 5, 2015.*
Geo Pallet Conveyor by FATA Automation http://www.geopalletconveyor.com/ May 5, 2015.*

(Continued)

*Primary Examiner* — H Gutman
(74) *Attorney, Agent, or Firm* — BrooksGroup

(57) ABSTRACT

A number of variations may include a method comprising providing a first design or a first reusable casting die for producing a vehicle rear rail having multiple pre-determined datum features; producing a first vehicle rear rail and a second vehicle rear rail from the first design or the first reusable casting die; wherein the first vehicle rear rail and the second vehicle rear rail are identical; using the first vehicle rear rail to make a first vehicle having a first wheelbase and using the second vehicle rear rail to make a second vehicle having a second wheelbase; and wherein the second wheelbase is longer than the first wheelbase.

6 Claims, 4 Drawing Sheets

(56) References Cited

OTHER PUBLICATIONS

GM Orion Plant Transformed for Sonic Production http://wardsauto.com/plants-amp-production/gm-orion-plant-transformed-sonic-production Aug. 7, 2012.*

Pin Pallets, Worthington Industries, http://www.worthingtonindustries.com/Products/Packaging-Solutions/Pin-Pallets May 5, 2015 Pin Pallets for Laser Welded Blanks, http://www.universal-tool.com/mat5.htm, May 5, 2015.*

\* cited by examiner

CAST DATUMS FOR WHEELBASE TUNING

TECHNICAL FIELD

The field to which the disclosure generally relates to includes automobile vehicles.

BACKGROUND

Datum points may be used in constructing a vehicle.

SUMMARY OF ILLUSTRATIVE VARIATIONS

One variation may include a product comprising: a rear rail; wherein the rear rail includes a planar base portion; and wherein the planar base portion includes multiple pre-determined datum features.

Another variation may include a method comprising: providing a first design or a first reusable casting die for producing a vehicle rear rail having multiple pre-determined datum features; producing a first vehicle rear rail and a second vehicle rear rail from the first design or the first reusable casting die; wherein the first vehicle rear rail and the second vehicle rear rail are identical; using the first vehicle rear rail to make a first vehicle having a first wheelbase and using the second vehicle rear rail to make a second vehicle having a second wheelbase; and wherein the second wheelbase is longer than the first wheelbase.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

One variation may include a product comprising a rear rail which may include multiple pre-determined datum features which may engage a common geo-pallet pin and which may be used to vary the length of the wheelbase of a vehicle.

Another variation may include a method providing a rear rail having multiple pre-determined datum features which may be used to assemble a vehicle having a long wheelbase or a short wheelbase.

A vehicle may be assembled in any of a number of variations including, but not limited to, the use of a geo-pallet conveyor system. The geo-pallet conveyor system may allow for the exchange of pallets off of an assembly line, for example a weld line, with other pallets which may allow for production of multiple platforms from the same line. A vehicle platform may include several vehicle styles, for example a long wheelbase or a short wheelbase. Alternatively, the same design of the rear rail with multiple pre-determined datum features may be used to produce rear rails for different production lines for producing vehicles with long wheelbases and short wheelbases.

A vehicle structure may be assembled with the use of a series of datum points. A geo-pallet pin may engage a datum feature on a vehicle component which may be used to control which vehicle style may be built, for example, a datum feature may be used in determining the length of the wheelbase.

Figure 1:
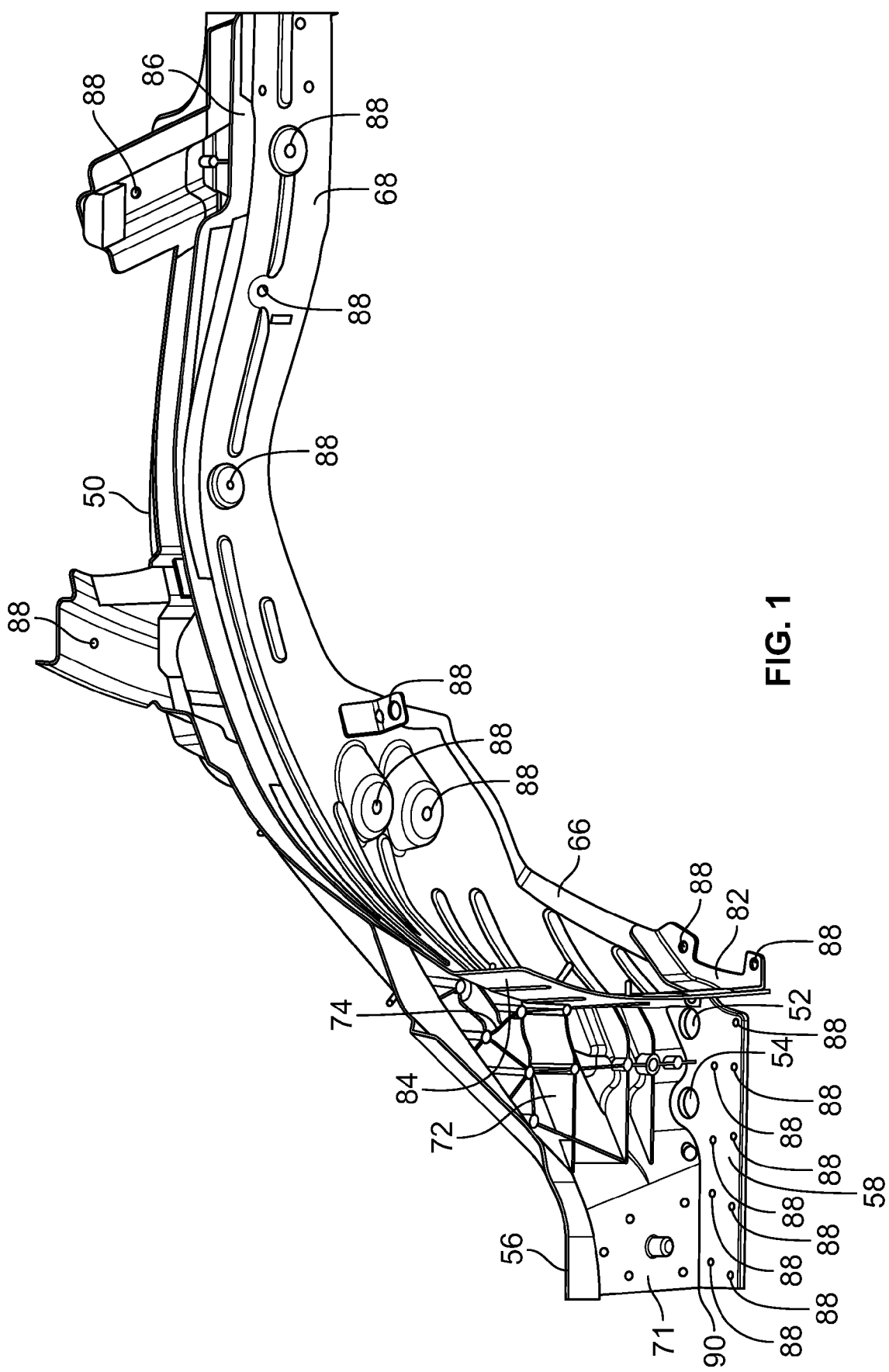
FIG. 1 depicts a rear rail according to a number of variations.
Figure 3:
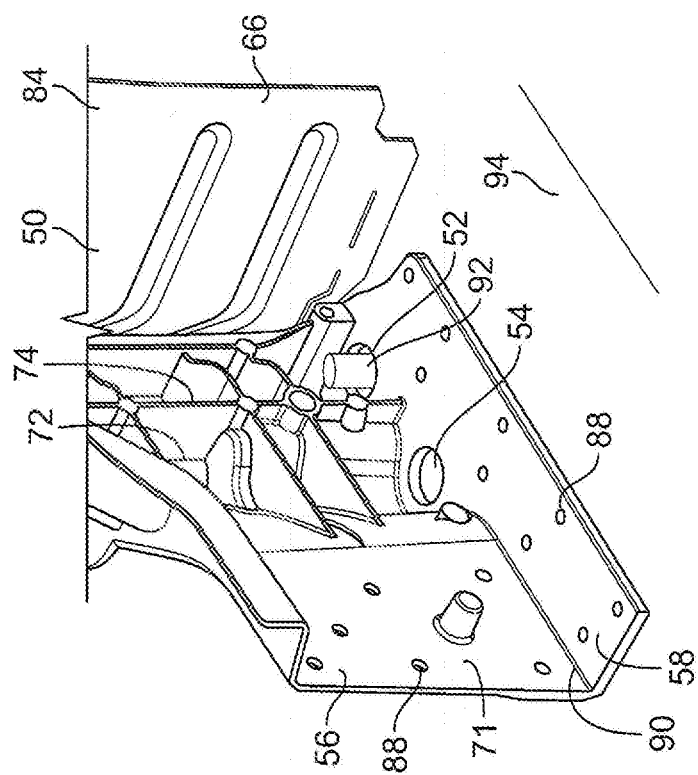
FIG. 3 depicts a close up of a rear rail according to a number of variations.
Figure 2:
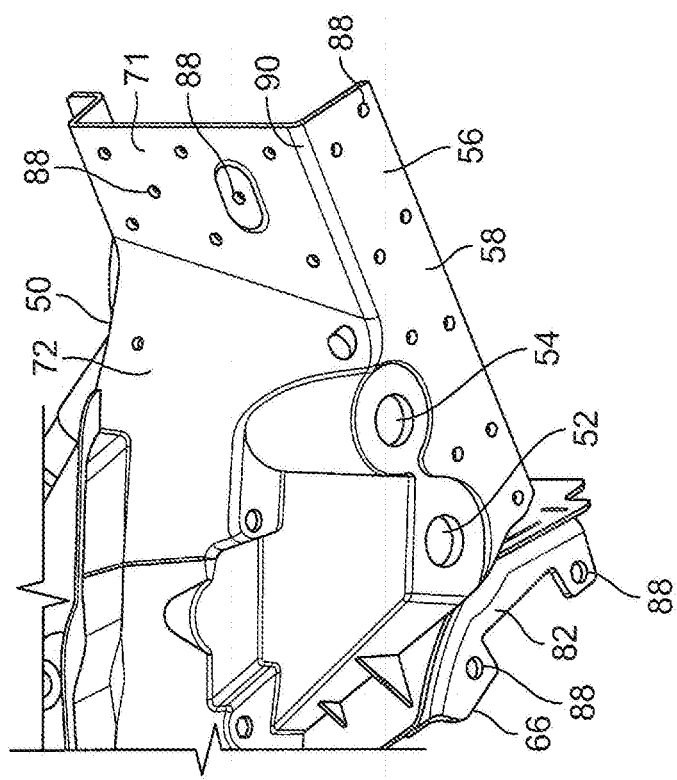
FIG. 2 depicts a close up of a rear rail according to a number of variations.
Figure 4:
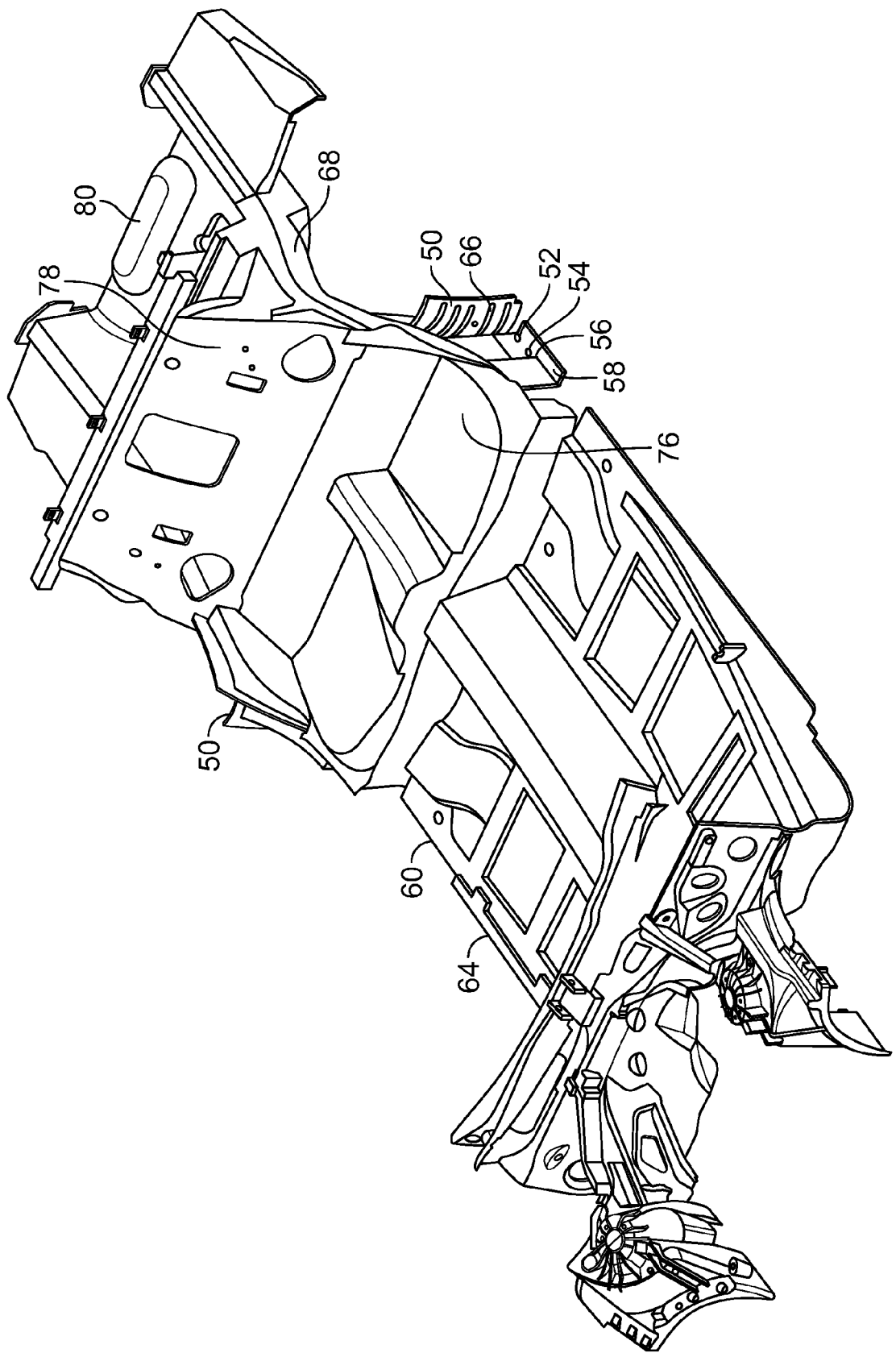
FIG. 4 depicts a short vehicle wheelbase according to a number of variations.
Figure 5:
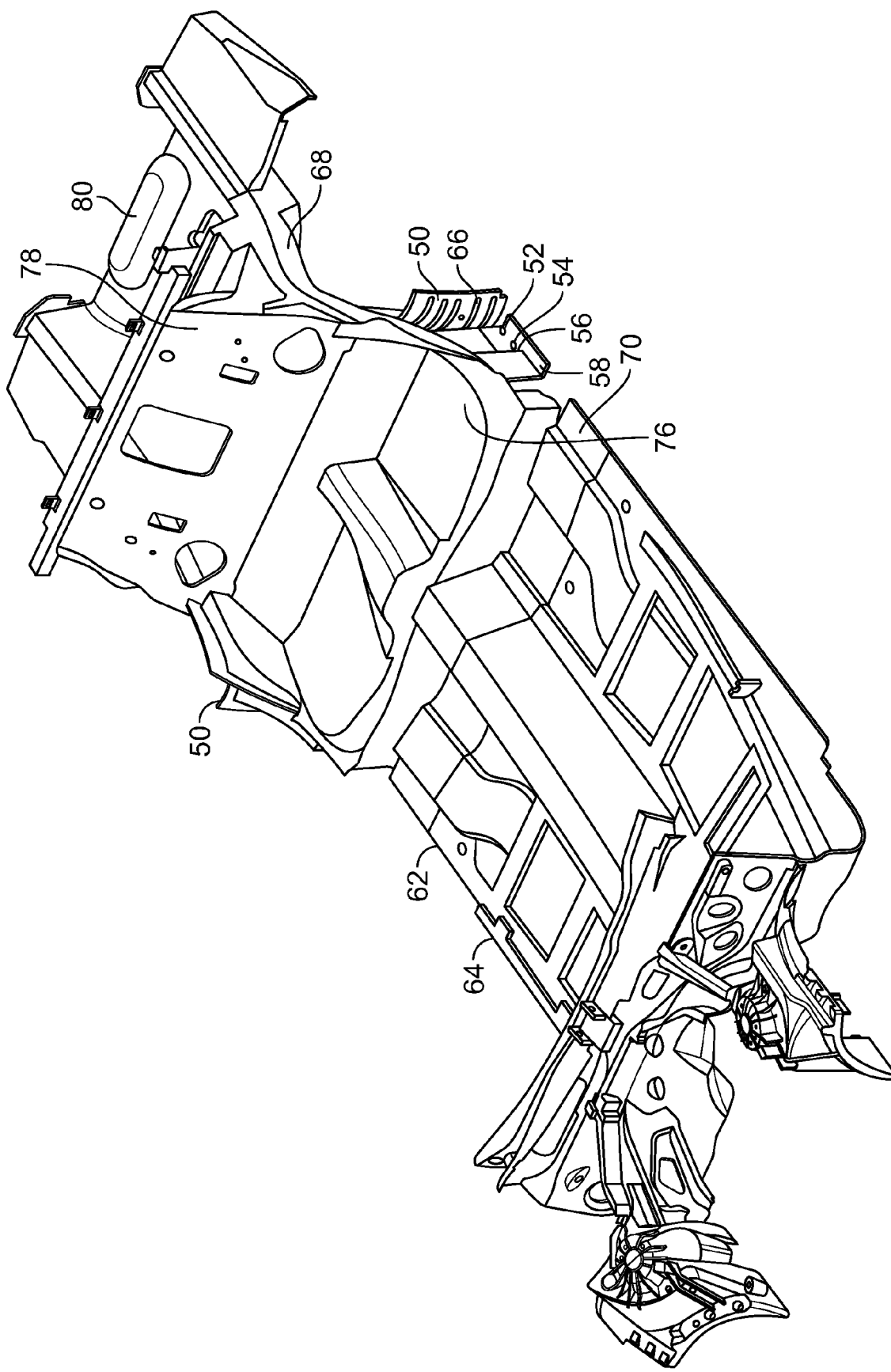
FIG. 5 depicts a long vehicle wheelbase according to a number of variations.

Referring to FIGS. 1-5, in any of a number of variations, a rear rail 50 may include multiple datum feature holes 52, 54 which may be used in the assembly of a vehicle to determine the length of the wheelbase. In one variation, the rear rails 50 may be constructed and arranged to accommodate the rear wheelhouse assemblies (not illustrated) of a vehicle. The rear rails 50 may include a frontal portion 56, a middle portion 66, and a rear portion 68. The frontal portion 56 may include a planar base structure 58 which may lay horizontal. A side wall structure 71 may extend substantially perpendicular from the inward edge 90 of the planar base structure 58. The rearward portion 72 of the side wall structure 71 may curve inward toward the rear tire tub 80 and may also include several reinforcement structures 74. The frontal portion 56 may be constructed and arranged to accommodate at least one of the seat pan 76, a portion of a seat back panel 78, or a rear wheelhouse assembly. The side wall 71 may be attached to the middle portion 66 of the rear rail 50. The side wall 71 may be constructed and arranged to accommodate at least one of a rear wheelhouse assemblies, a seat back panel 78, or a rear tire tub 80. The middle portion 66 may include a planar base structure 82. A middle wall structure 84 may extend from the base portion 82 which may be adjacent to the frontal planar base portion 58 and may curve inward toward the rear tire tub 80. The middle portion 66 may also slope upwards as it extends toward the rear portion 68. The rearward portion 68 may be constructed and arranged to accommodate at least one of a portion of the rear tire tub 80 or the rear wheelhouse assemblies. The rear portion 68 may include a structure 86 which may curve away from the rear tire tub 80. The rear rails 50 may also include several assembly features or holes 88 which may be used in the assembly of the vehicle body. The planar base portion 58 of the rear rail 50 may also include a front datum feature hole 54 which may be located at a distance forward of a rear datum feature hole 52. The datum feature holes 52, 54 may be any of a number of dimensions in order to mate with a common geo-pallet pin 92 on a geo-pallet 94, a variation of which is illustrated in FIG. 3. The rear rails 50 may be constructed in any of a number of variations including, but not limited to, high pressure die casting.

During assembly, if the rear rail 50 rear datum feature hole 52 is used to engage the rear rail 50 to the common geo-pallet pin 92, the underbody 64 may be assembled as a short wheelbase 60. If the rear rail 50 front datum feature hole 54 is used to engage the rear rail 50 to the common geo-pallet pin 92, the underbody 64 may be assembled as a long wheelbase 62. For a longer wheelbase, a patch 70 may be added to the underbody 64 to increase the length of the underbody 64 and thus the wheelbase. The use of a front hole 54 and a rear hole 52 may allow for identical rear rail components 50 to be used on multiple pre-determined wheelbase dimensions. In a number of variations, more than two datum features may be provided in the rear rail for use in making more than two different wheelbase vehicles.

A number of variations may include a method including providing a first design or a first reusable casting die for producing a vehicle rear rail having multiple pre-determined datum features, producing a first vehicle rear rail and a second vehicle rear rail from the first design or the first reusable casting die, using the first vehicle rear rail to make a first vehicle having a first wheelbase and using the second vehicle rear rail to make a second vehicle having a second wheelbase, and wherein the second wheelbase is longer than the first wheelbase.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a rear rail; wherein the rear rail includes a planar base portion; and wherein the planar base portion includes multiple pre-determined datum features.

Variation 2 may include a product as set forth in Variation 1 wherein the multiple pre-determined datum features include a front hole and a rear hole.

Variation 3 may include a product as set forth in any of Variations 1-2 wherein the front hole and the rear hole are each constructed and arranged to engage a pin on a pallet.

Variation 4 may include a product as set forth in any of Variations 1-3 wherein the front hole is a datum point for a long wheelbase and wherein the rear hole is a datum point for a short wheelbase.

Variation 5 may include a product as set forth in any of Variations 1-4 wherein the pallet is attached to a geo-pallet conveyor system.

Variation 6 may include a product as set forth in any of Variations 1-5 wherein the rear rail is high pressure die cast.

Variation 7 may include a method comprising: providing a first design or a first reusable casting die for producing a vehicle rear rail having multiple pre-determined datum features; producing a first vehicle rear rail and a second vehicle rear rail from the first design or the first reusable casting die; wherein the first vehicle rear rail and the second vehicle rear rail are identical; using the first vehicle rear rail to make a first vehicle having a first wheelbase and using the second vehicle rear rail to make a second vehicle having a second wheelbase; and wherein the second wheelbase is longer than the first wheelbase.

Variation 8 may include a method as set forth in Variation 7 wherein at least one of the multiple pre-determined datum features engage a pin on a pallet.

Variation 9 may include a method as set forth in Variation 8 wherein the multiple pre-determined datum features include a front hole and a rear hole.

Variation 10 may include a method as set forth in Variation 9 wherein the front hole and the rear hole are each constructed and arranged to engage a pin on a pallet.

Variation 11 may include a method as set forth in Variation 10 wherein the front hole is a datum point for a long wheelbase and wherein the rear hole is a datum point for a short wheelbase.

Variation 12 may include a method as set forth in Variation 11 further comprising engaging a pin on a pallet in one of the front hole or rear hole Variation 13 may include a method as set forth in Variation 12 further comprising attaching the pallet is attached to a geo-pallet conveyor system.

Variation 14 may include a method as set forth in any of Variations 7-13 further comprising forming the rear rail by a high pressure die casting process so that the rear rail is a rear rail casting.

The above description of select examples of the invention is merely illustrative in nature and, thus, variations or variants thereof are not to be regarded as a departure from the spirit and scope of the invention.

What is claimed is:

1. A method comprising:
   providing a first design or a first reusable casting die for producing a vehicle rear rail having multiple pre-determined datum features;
   producing a first vehicle rear rail and a second vehicle rear rail from the first design or the first reusable casting die;
   wherein the first vehicle rear rail and the second vehicle rear rail are identical;
   using the first vehicle rear rail to make a first vehicle having a first wheelbase and using the second vehicle rear rail to make a second vehicle having a second wheelbase;
   wherein the second wheelbase is longer than the first wheelbase;
   wherein at least one of the multiple pre-determined datum features engage a pin on a pallet; and
   wherein the multiple pre-determined datum features include a front hole and a rear hole.

2. A method as set forth in claim 1 further comprising forming the rear rail by a high pressure die casting process so that the rear rail is a rear rail casting.

3. A method as set forth in claim 1 wherein the front hole and the rear hole are each constructed and arranged to engage a pin on a pallet.

4. A method as set forth in claim 3 wherein the front hole is a datum point for a long wheelbase and wherein the rear hole is a datum point for a short wheelbase.

5. A method as set forth in claim 4 further comprising engaging a pin on a pallet in one of the front hole or rear hole.

6. A method as set forth in claim 5 further comprising attaching the pallet to a geo-pallet conveyor system.

* * * * *